US006155124A

United States Patent [19]

Wirths

[11] Patent Number: 6,155,124

[45] Date of Patent: Dec. 5, 2000

[54] SMALL MOTORIZED DRIVE MEANS FOR A MOVABLE FUNCTIONAL ELEMENT IN A MOTOR VEHICLE

[75] Inventor: Rainer Wirths, Wuppertal, Germany

[73] Assignee: Robert Bosch GmbH, Stuttgart, Germany

[21] Appl. No.: 09/176,907

[22] Filed: Oct. 22, 1998

[30] Foreign Application Priority Data

Oct. 25, 1997 [DE] Germany .......................... 197 47 211

[51] Int. Cl.[7] ............................ F16H 27/02; F16H 29/02

[52] U.S. Cl. ........................................... 74/89.13; 292/201

[58] Field of Search ............................... 74/89.13, 89.14, 74/89.16, 89.21; 292/201, 144

[56] References Cited

U.S. PATENT DOCUMENTS

| | | | |
|---|---|---|---|
| 5,649,726 | 7/1997 | Rogers, Jr. et al. | 292/201 |
| 5,876,074 | 3/1999 | Dowling | 292/201 |
| 5,934,717 | 8/1999 | Wirths et al. | 292/201 |
| 5,938,253 | 8/1999 | Szablewski et al. | 292/201 X |
| 5,997,055 | 12/1999 | Strathmann | 292/201 |

FOREIGN PATENT DOCUMENTS 196 14 122 10/1997 Germany .

*Primary Examiner*—David A. Bucci
*Assistant Examiner*—Colby Hansen
*Attorney, Agent, or Firm*—Nixon Peabody LLP; David S. Safran

[57] ABSTRACT

A small motorized drive for a movable functional element in a motor vehicle, especially for a motor vehicle closing device, with a drive element (11) which can be driven by an electric drive motor and a carrier (12) which transfers the force of the drive element (11) to the functional element and which is generally coupled to the drive element (11), but not to the functional element. The running electric drive motor can be shut off in at least one stopping position by blocking of continued movement of the drive element (11) in the driven direction of motion by the carrier (12) striking a carrier stop surface on the functional element (blocked mode). When blocking of the continued movement of the drive element (1) in the driven direction of motion occurs, blocking of backward motion of the drive element (11) relative to the driven direction of motion takes place.

23 Claims, 8 Drawing Sheets

SMALL MOTORIZED DRIVE MEANS FOR A MOVABLE FUNCTIONAL ELEMENT IN A MOTOR VEHICLE

BACKGROUND OF THE INVENTION

1. Field of the Invention

The invention relates to a small motorized drive means for a movable functional element in a motor vehicle, especially for a motor vehicle closing means, with a drive element which can be driven by an electric drive motor and a carrier which transfers the force of the drive element to the functional element, and which, generally, is coupled to the drive element but not to the functional element. In particular, to such a drive in which the running electric drive motor, in one shutoff position, can be shut off by blocking the continued movement of the drive element in its direction of motion with the functional element, especially by the carrier striking a carrier stop surface on the functional element.

2. Description of Related Art

Small motorized drive means of the type under consideration have been installed in motor vehicles at a host of locations and are generally called "actuating elements." For example, such drive means have been used for motor vehicle closures, such as a motor vehicle rear hatch lock, and to all types of motor vehicle closing mechanisms including motor vehicle door locks, etc., and to other types of driven mechanisms in motor vehicles.

A motorized drive means used in a motor vehicle rear hatch lock of the type to which the present invention is directed (published German Patent Application DE-A-196 14 122 which corresponds to U.S. Pat. No. 5,934,767) moves a movable functional element of a detent pawl which holds a lock latch in the front catch or main catch by means of a catch projection. The drive element is made as a rotating element, specifically as a worm wheel or worm wheel drive, and can be driven in only one direction of rotation. By turning the drive element in the functionally stipulated direction of rotation, the carrier strikes an actuating surface of the detent pawl and lifts the catch projection of the detent pawl off the main catch of the lock latch. In the direction in which the carrier runs, behind the actuating surface on the detent pawl, is a carrier stop surface which lies in the path of motion of the carrier and stops the latter when the detent pawl is raised off the main catch, but for a detent pawl located in the overstroke position, it is located outside of the path of motion of the carrier and allows it to pass the carrier. The drive is turned off when the carrier strikes the carrier stop surface (blocked mode).

In the prior art which has already been explained, the electric motor is turned off as soon as the carrier strikes the carrier stop surface (blocked mode). Therefore, the functional element forms a more or less fixed stop for the drive element. The tolerances and deformation possibilities of the entire arrangement determine how the electric drive motor is "blocked" by interposition of the drive, and how the overall arrangement behaves after the power supply of the electric drive motor is turned off. In the prior art, the time of flow through the electric drive motor is controlled such that a permanently set over-travel time of, for example, 300 to 500 ms is provided. This permanently set over-travel time must also take into account the most extreme operating conditions.

For controlled shutoff of the electric drive motor which can be reproduced under all conditions a "hard" blocked mode with low tolerances and low inherent elasticity of the overall arrangement would be desirable. Aspects of operating reliability, noise development and wear, on the other hand, call for tolerances and a minimum amount of inherent elasticity of the overall arrangement.

Overall, it is extremely difficult to correctly take into account the reset forces which occur at the given elasticity of the overall arrangement, but also rebound effects under all operating conditions. Nevertheless, it is desirable, even essential for many applications, that the drive element reaches and maintains the shutoff position as accurately as possible, especially to prevent any adverse effect on further operation of the drive means when the following control commands are shut off.

The aforementioned problem of the opposing objectives of obtaining a "hard" blocked mode with "soft" (specifically elastic) characteristics has already been recognized (published European Patent Application No. EP-A-0 684 356). The approach found there works with a spring acting in both directions between the drive elements and a carrier which is tensioned when the carrier strikes the carrier stop surface. The spring path made available, in this way, which the drive element can still traverse with the carrier fixed is used to shut off the electrical drive motor (as always), the spring force then causing reset of the drive element opposite the motion into the shutoff position defined by the carrier. It has already been recognized in this prior art that the inertia of masses of the system leads to the carrier rising somewhat from the stop surface in the backward motion and comes to rest only at a short distance from the stop surface. In practice, it has been shown that the shutoff position defined in this way cannot be reproduced exactly enough, with the consequence of malfunctions.

SUMMARY OF THE INVENTION

The primary object ofthe present invention is to configure and develop a small motorized drive means of the initially mentioned type such that in the blocked mode a shutoff position of the drive element which is as exact and reproducible as possible can be reached.

The aforementioned object is achieved in a small motorized drive means with a drive element which can be driven in a given direction by an electric drive motor and a carrier which transfers the force of the drive element to the functional element, and which is coupled to the drive element, but not to the functional element, and where the running electric drive motor can be shut off in one shutoff position by blocking the continued movement of the drive element in the driven direction of motion by the functional element, especially by the carrier, striking a carrier stop surface on the functional element, and that blocking of the backward motion of the driven element relative the direction of driven motion takes place when blocking of the continued movement of the drive element in the driven direction of motion occurs.

It should be pointed out that the teaching of the invention can be accomplished especially feasibly in a drive element which is made as a rotating element, especially in a worm wheel of a worm wheel drive, as is done in the prior art, but the teaching of the invention can also be used for other types of drive elements, carriers and functional elements, for example, for screw/nut arrangements, rack/rack wheel arrangements, etc. As a prerequisite for applicability of the invention, it is important that, by means of play or the inherent elasticity of the overall arrangement, some backward motion of the drive element can take place relative to the driven direction of rotation; therefore, complete self-locking with respect to backward motion is not accomplished.

In the drive means which is not inherently self-locking with respect to motion opposite the driven direction of motion, according to the invention, backward motion of the drive element with respect to the driven direction of motion can to a certain extent be blocked "selectively". This leaves the advantages of the nonexistent or incomplete self-locking of the drive means otherwise; under certain circumstances, this is advantageous or even necessary, for example, for an emergency opening function in a motor vehicle closing means, and thus, it eliminates this source for poor reproducibility of the shutoff position, however, at the instant at which this is necessary.

As stated, the teaching of the invention can be used in all types of small motorized drive mechanisms for movable functional elements in a motor vehicle; therefore, it is applicable above and beyond the area of motor vehicle closing mechanisms. The invention can be accomplished, as likewise already indicated, in all correspondingly operating component pairs, not only in a rotating drive element, even if it can be used to special advantage there.

One structurally especially practical embodiment is one wherein the drive element is supported on a carrier and is provided with a movable blocking element; wherein there is an engagement opening on the carrier which corresponds to the blocking element; and wherein the blocking element fits into the engagement opening and prevents backward motion of the drive element when the shutoff position of the drive element is reached. This embodiment integrates a movable blocking element into the drive element of the drive mechanism, so that the number of components of the drive mechanism is not increased in spite of the additional function.

Other preferred embodiments and developments as well as particulars and advantages of the invention are explained in the following in conjunction with the explanation of one preferred embodiment of the invention using the drawings.

DETAILED DESCRIPTION OF THE PREFERRED EMBODIMENT

Figure 1:
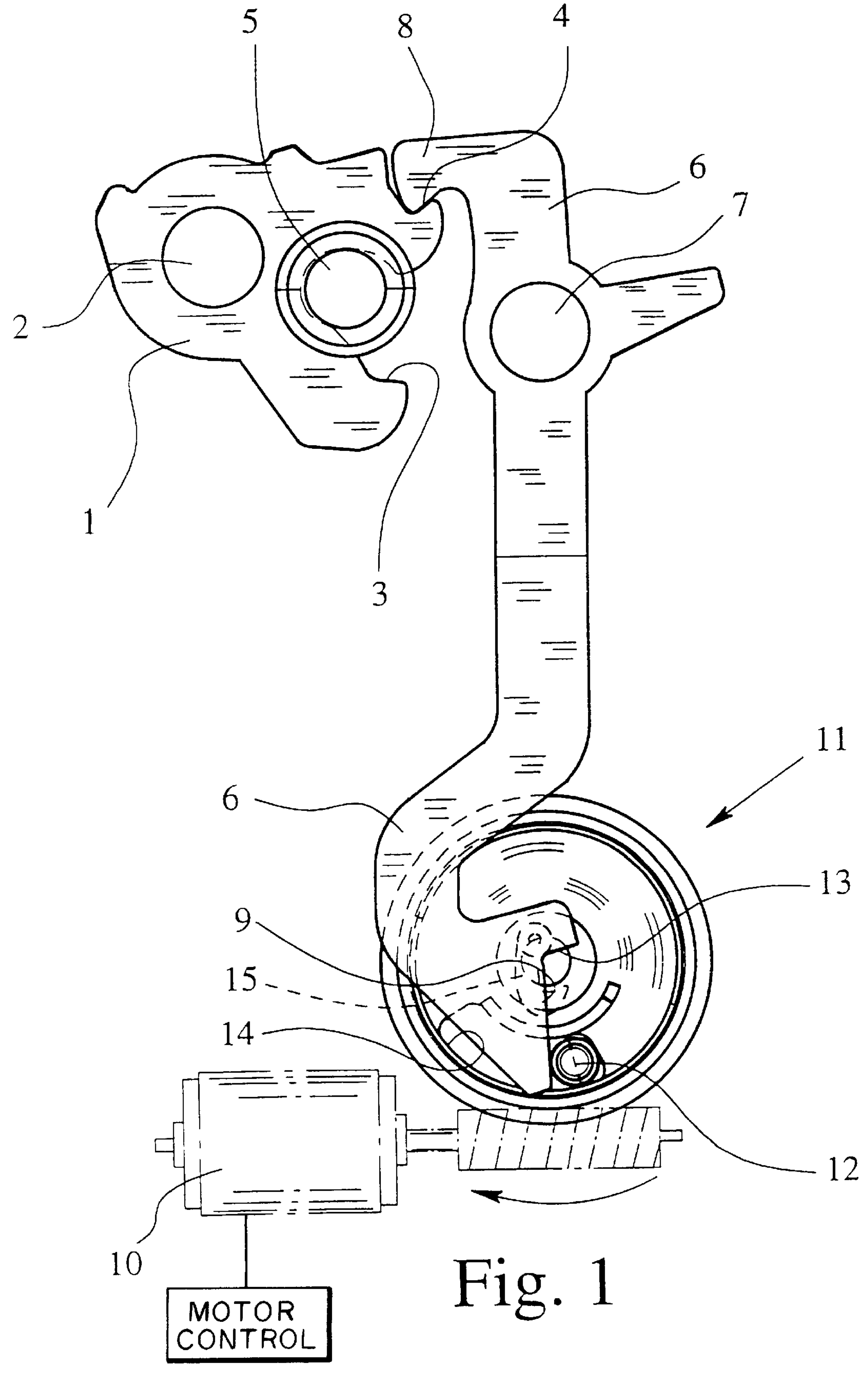
FIG. 1 shows a highly simplified view of one embodiment of a motor vehicle rear hatch lock in which a small motorized drive in accordance with the present invention is used.

While FIG. 1 shows, as an example of a small motorized drive mechanism for a movable functional element in a motor vehicle, for use in a motor vehicle closure, specifically a motor vehicle rear hatch lock, as indicated above, this should not be understood as indicating a limitation on the uses to which the invention may be applied.

The motor vehicle rear hatch lock shown, first of all, has a lock latch 1 which can be moved from an open position into a front catch position and into a main catch position and vice versa. The lock latch 1, here made as a rotary latch pivotally mounted on a bearing axle 2, has a front catch 3 and a main catch 4, as is apparent. In this figure, a lock hinge 5 is shown held between the fork legs of the lock latch 1 with the lock latch 1 being in the closed position.

Furthermore, there is a detent pawl 6 which keeps the lock latch 1 in the front catch position and in the main catch position. This detent pawl is supported on a bearing axle 7, and is made, in this case, as a tensile-stressed pawl with two arms. The detent pawl 6 has a catch projection 8 with which it keeps the lock latch 1 in FIG. 1 engaged to the main catch 4 in the closed position. Moreover, the detent pawl 6 has an actuating surface 9.

An electric motor drive is provided which has an electrical drive motor 10 and a drive element 11 which can be driven by it. In this embodiment, the drive element 11 comprises the worm wheel of a common worm wheel drive. The drive element 11 also has a carrier 12 which transfers the force of the drive element 11 to the functional element 6, here therefore the detent pawl, and which normally (generally) is coupled to the drive element 11, but not to the functional element 6. There are structures which also provide for a fixed coupling so that this should not, in general, be precluded.

In this embodiment, the carrier 12, in the driven direction of motion (arched arrow in FIG. 1) strikes the actuating surface 9 of the functional element 6, and thus, lifts the catch projection 8 out of the main catch 4 of the lock latch 1. On the functional element 6, however, behind the actuating surface 9 relative to the driven direction of motion there is, moreover, a carrier stop surface 13 which defines the shutoff position for the electrical drive motor 10. By blocking further movement of the drive element 11 in the driven direction of motion with the stationary functional element 6, especially by carrier 12 striking the carrier stop surface 13 on the functional element 6, the running electric drive motor 10 is shut off (blocked mode). The particulars of this shutoff and the particulars of a "hard" and a "soft" blocked mode were explained above in the Background part of this specification, to which reference should be made, and from which it can be established that the shutoff position defined in the above explained manner must be as exactly reproducible as possible without the drive means having to be completely self-locking.

Furthermore, it should be mentioned that the lock latch 1 of the embodiment shown in FIG. 1, has a front catch 3 and a main catch 4, that the drive means, itself, however, has the above described function only for the main catch 4, not for the front catch 3. It can easily be imagined how the functional sequences for the main catch 4 in a lock latch 1 which continues to open could be repeated also for the front catch 3, especially if mechanical self-control of the arrangement is not accomplished in the area of the front catch 3, which is essentially the subject matter of the published application described initially.

Figure 2:
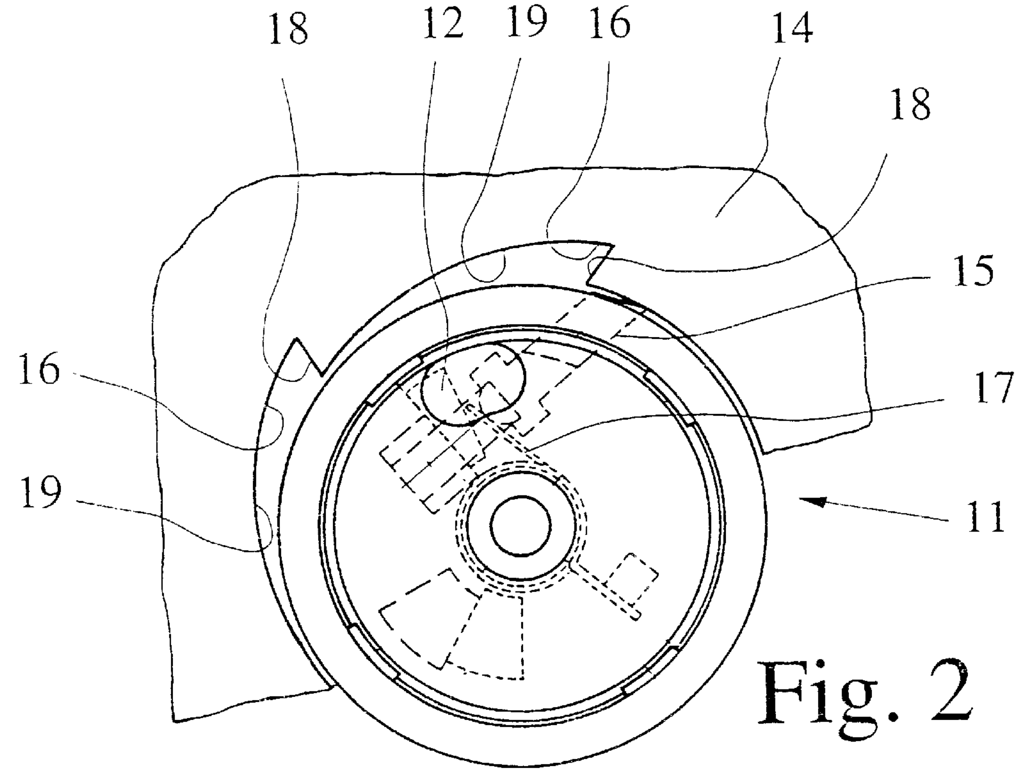
FIG. 2 shows the area of the drive element of a drive for a motor vehicle closing mechanism with a main catch and a front catch in the position shortly before reaching a first shutoff position.

FIG. 2 shows a drive element 11 of a drive according to the present invention which has been modified to function for both the front catch and also the main catch. FIGS. 2–7 show the operating sequence.

When blocking of the continued movement of the drive element 11 in the driven direction of motion occurs, according to the invention, blocking of the backward motion of the drive element 11 relative to the driven direction of motion occurs. With blocking, the shutoff position becomes, for the most part exactly reproducible, because rebound which takes place due to tolerances and inherent elasticity relative the driven direction of motion is essentially suppressed. The tolerances for blocking of backward motion are dimensioned such that maintenance of the shutoff position takes place, likewise, with the desired tolerance.

This embodiment shows, as explained, not only one shutoff position, but two shutoff positions which, in the driven direction of motion of the drive element 11, are reached in succession, and blocking of backward motion takes place in both shutoff positions. Its importance has been explained above.

For a drive element 11 which can move in only one direction of motion, then therefore in only one direction of rotation (aside from the backward motion which is possible due to lack of self-locking or little self-locking), there can be permanent blocking of the backward motion of the drive element 11 relative to the driven direction of motion, as shown in the drawings. But, it can also be provided that blocking of the backward motion can be canceled again without further motion of the drive element 11, preferably after a certain defined time interval. Under certain circumstances, this requires greater technical cost which is undesirable in many cases.

Various structural approaches can be found for implementation of blocking of backward motion, for which examples are given below.

The embodiment shown in the function sequence of FIGS. 2 to 7 is a version in which the drive element 11 is supported on a support 14 and is provided with a movable blocking element 15. On the support 14, there is an engagement opening 16 which corresponds to the blocking element 15. When the shutoff position of the drive element 11 is reached, the blocking element 15 fits into the engagement opening 16 and prevents backward motion of the drive element 11.

A kinematically reversed arrangement could be obtained with the blocking element 15 on the support 14 and the engagement opening 16 on the drive element 11. For two shutoff positions, then, either two blocking elements 15 would have to be located on the support 14 or two engagement openings 16 on the drive element 11.

This embodiment also shows that the blocking element 15, which is located here on the drive element 11, is prestressed in the engagement direction by a spring 17. In the transition from FIG. 2 to FIG. 3, it can be seen how, when reaching the first shutoff position, the blocking element 15, under the force of spring 17, snaps radially outwardly into engagement opening 16, and in this way, prevents backward motion, here due to the rotary drive element 11, i.e., by clockwise rotation of the drive element 11.

This embodiment, furthermore, shows a preferred approach in which the engagement opening 16 has a blocking edge 18 which adjoins the slanted reset cam 19 for the blocking element 15. It is not shown that the blocking edge 18 could also be adjoined first by an intermediate piece before the obliquely running reset cam 19 starts. In this embodiment, the reset cam 19 runs obliquely in an arc as far as the innermost position of the blocking edge 18 of the next engagement opening 16 for the second shutoff position. This behavior of the reset cam 19 results in the possibility of the blocking element 15 being pushed back against the force of the spring 17 with low friction into the drive element 11 until then the second shutoff position is reached.

The configuration of the edges and cams acquires great importance, for example, also the configuration of the face of the blocking element 15 which is not entirely congruent with respect to the guide cam on the support 14. The different angular position, which is shown in the drawing and which is chosen there, causes little friction to be added by the blocking element 15 when the drive element 11 is rotated, and thus, only a minor increase of energy consumption as compared to a drive element 11 which is not provided with a blocking element 15.

Figure 3:
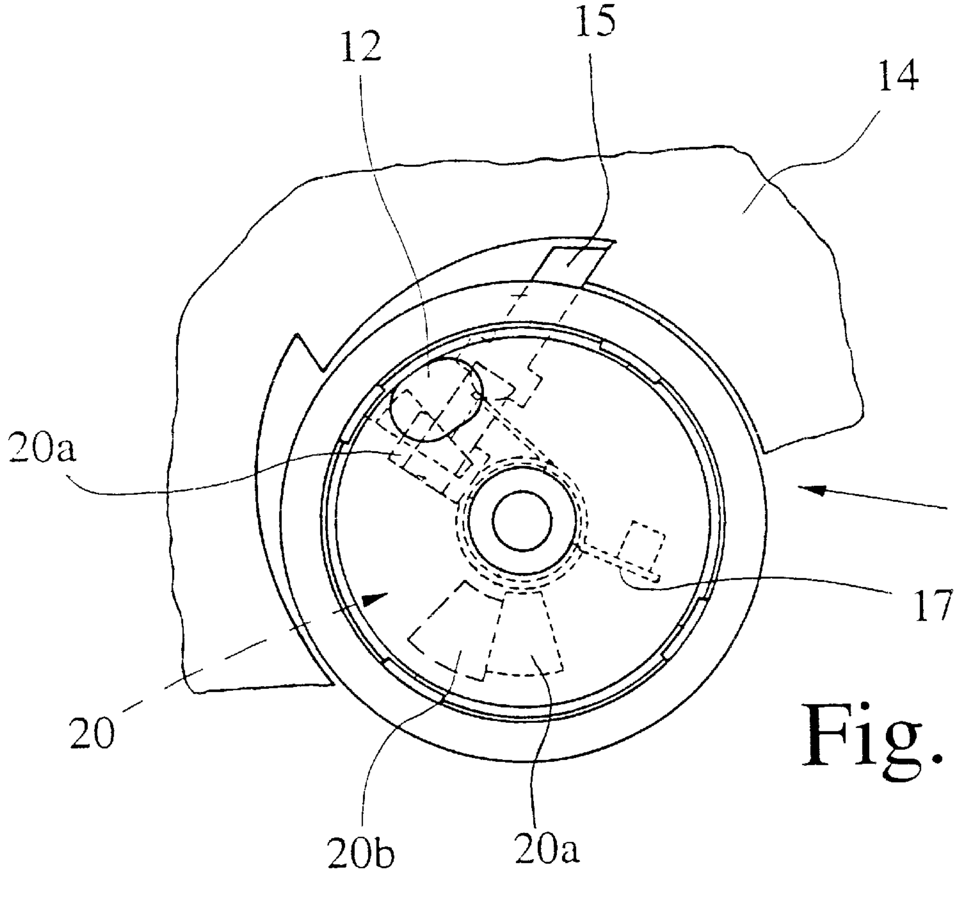
FIG. 3 is a view corresponding to FIG. 2 but showing the drive element after reaching the first shutoff position.
Figure 4:
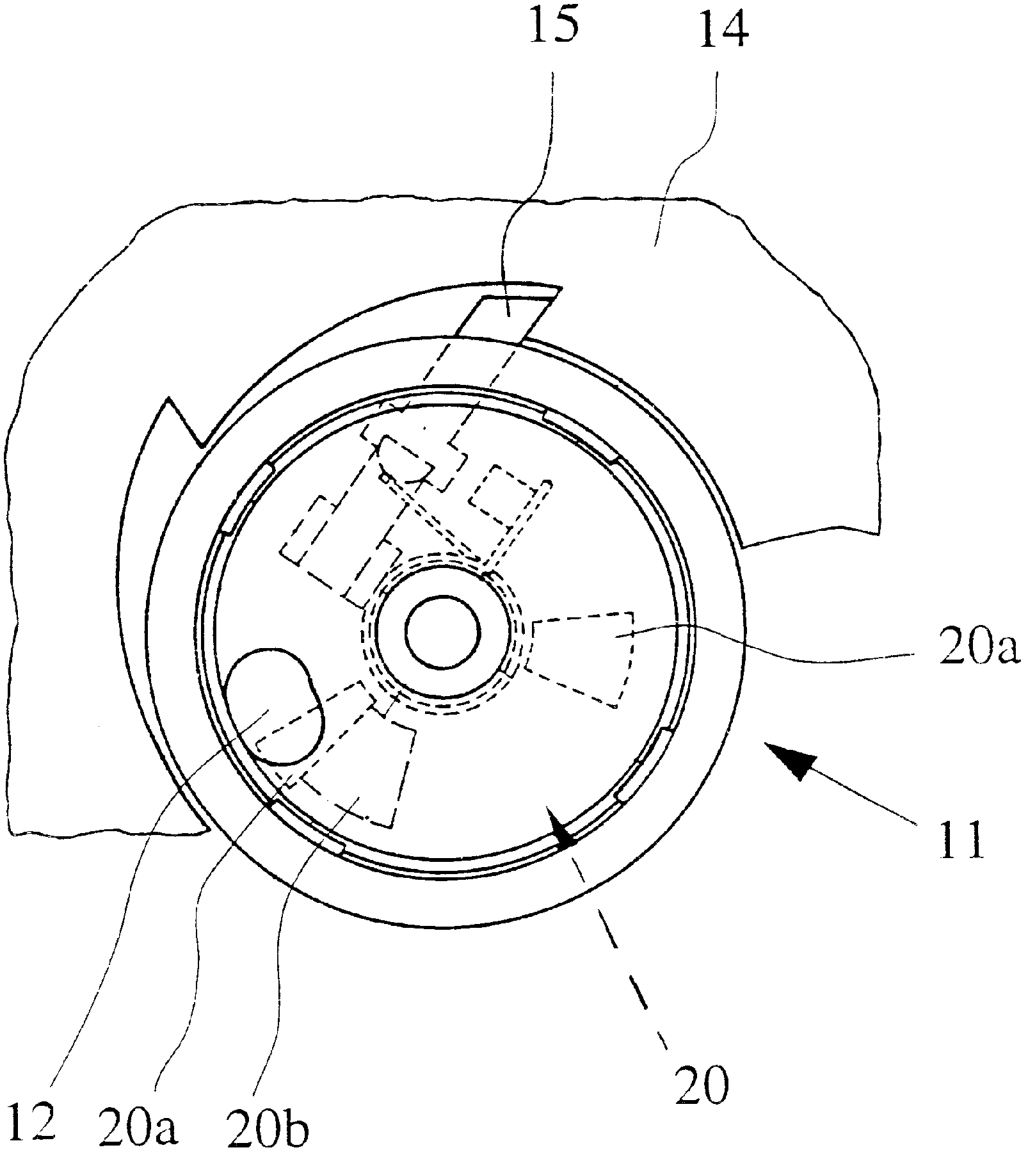
FIG. 4 is a view corresponding to FIG. 3, with the drive element in the first shutoff position, but with the carrier having continued to move after release by the functional element under spring force in its rest position.

Proceeding from FIG. 3 on to FIG. 4, it can be seen that the carrier 12 has been moved with respect to the drive element 11 over a limited arc, an angle from roughly 70° to 90° relative to drive element 11. This corresponds to the motion of the carrier 12 in an overstroke of the functional element 6 (release of the carrier 12). The drive element 11 allows this relative motion of the carrier 12 over a certain arc that is limited by an clear section 20 or the like. Undercut 20 is formed, in the embodiment shown, by stops **20*a* and a lug 20*b* which lies between these stops 20*a*, 20*b*. By means of a spring, which in the preferred embodiment shown is spring 17 of the blocking element 15 so that another spring need not be installed, the carrier 12 is pre-tensioned into the end position which is the leading end relative to the driven direction of motion of the drive element 11; attainment of this position is shown in FIG. 4. By means of the blocking action of the functional element 6, as shown in FIG. 3, the carrier 12 is pressed back against the action of the force of the spring 17 so that the stop 20*a* abuts the lug 20*b* from the right. Conversely, the other stop 20*a*, in FIG. 4, abuts the lug 20*b*** from the left.

Figure 5:
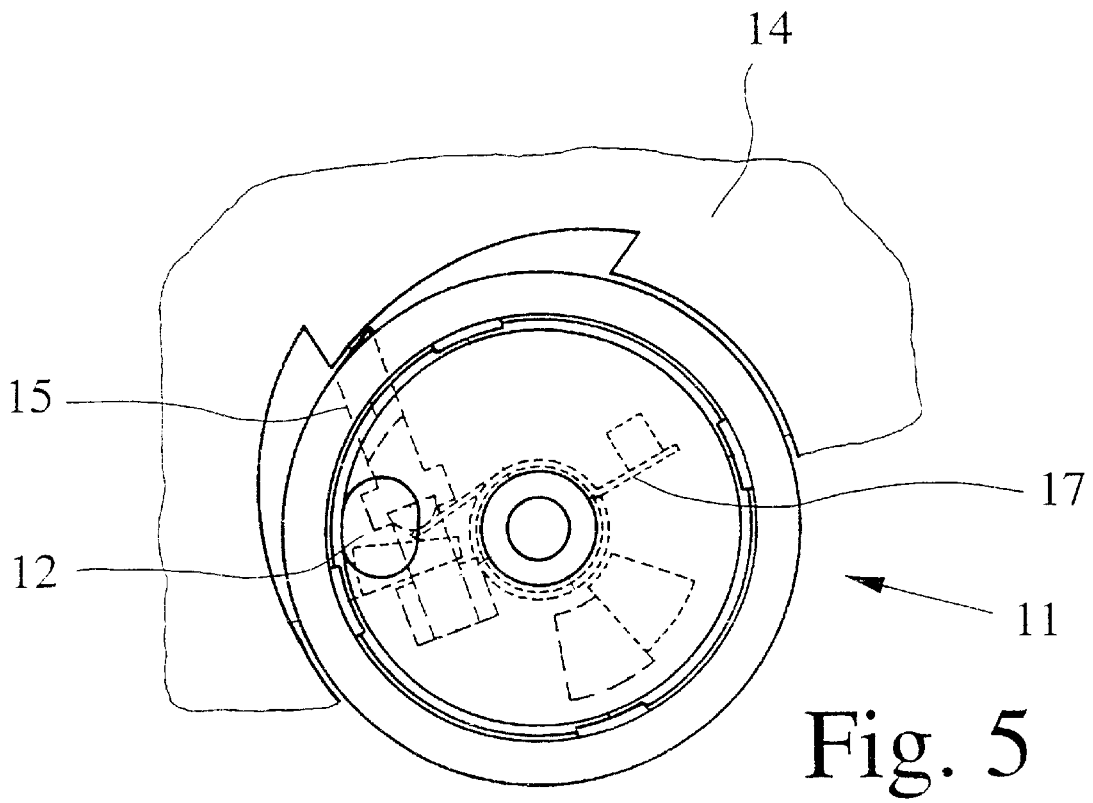
FIGS. 5, 6 and 7 show a sequence of movements corresponding to those from FIGS. 2, 3, and 4 but for a second shutoff position.
Figure 6:
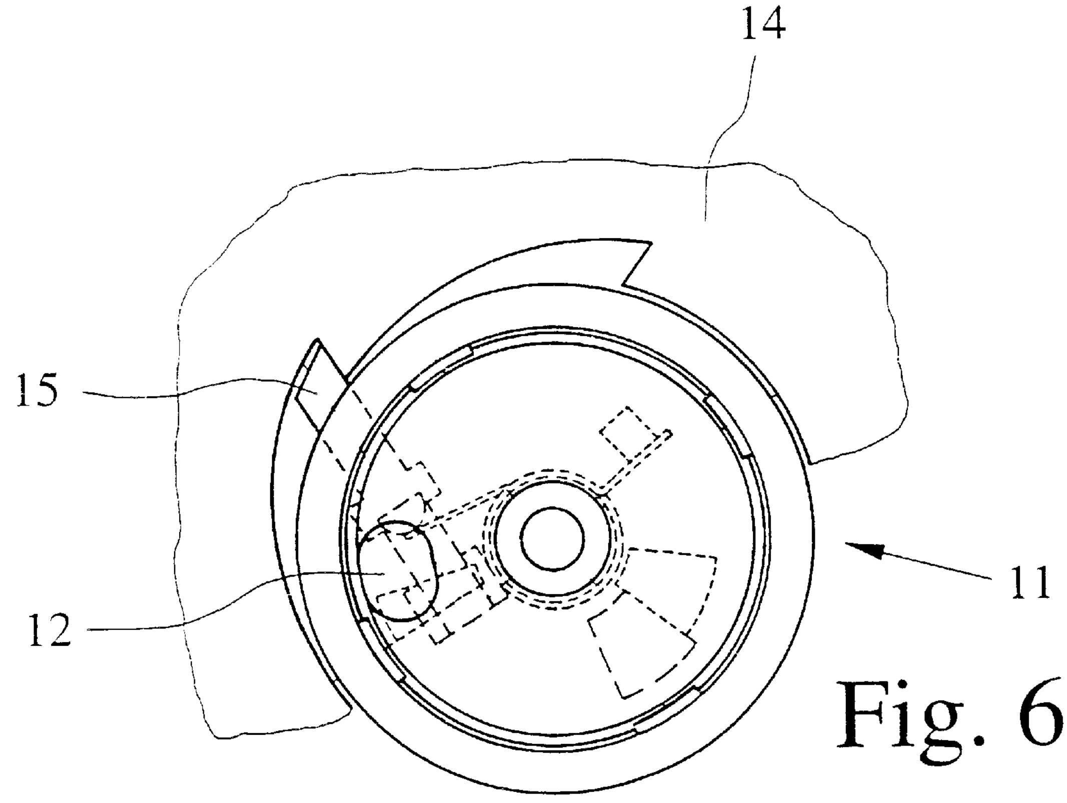
Figure 7:
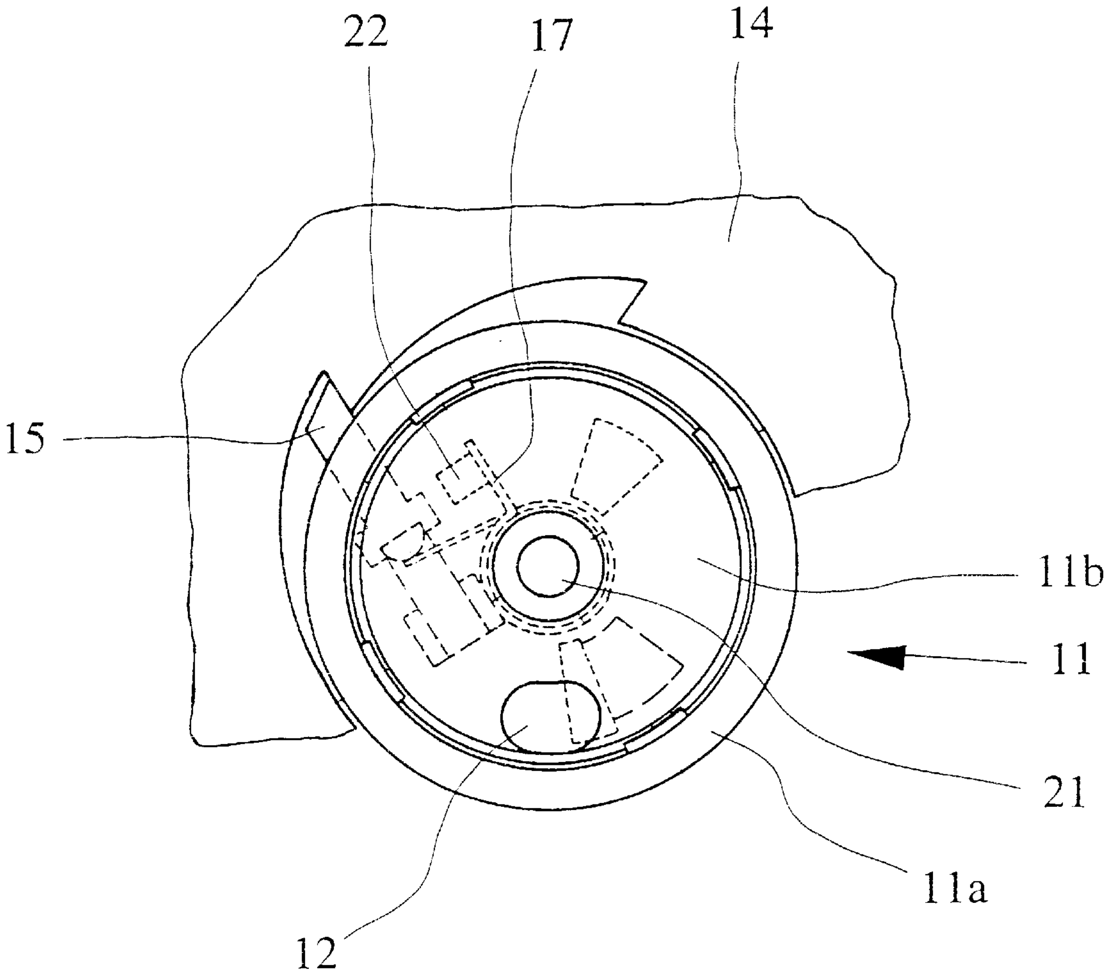

FIGS. 5–7 show the corresponding sequence for the second shutoff position, the functioning relative to the attainment of these positions being the same as for corresponding the views of FIGS. 2–4, so that detailed comments relative to FIGS. 5–7 are unnecessary. After release of the functional element 6, as shown in FIG. 7, the movement of the carrier lug 12 into the leading end position shown in FIG. 7 follows, from which, then, the drive element 11 can easily return the drive element 11 again into an initial position or rest position which lies between the position of FIG. 7 and the position of FIG. 2. Basically FIG. 7, itself, could also represent the rest position from which a new opening process can be started if, beforehand, the motor vehicle closing means which applies to the embodiment has been brought back into the closed state.

Figure 11:
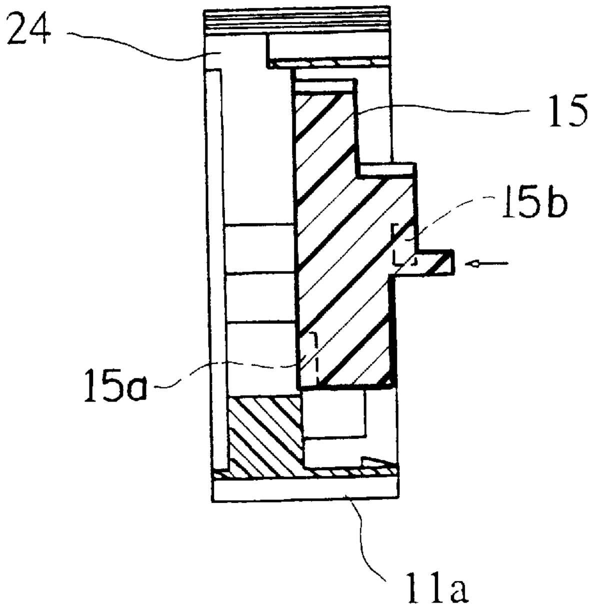
FIG. 11 is a sectional view of the subcomponent taken along line 11—11 in FIG. 10.
Figure 12:
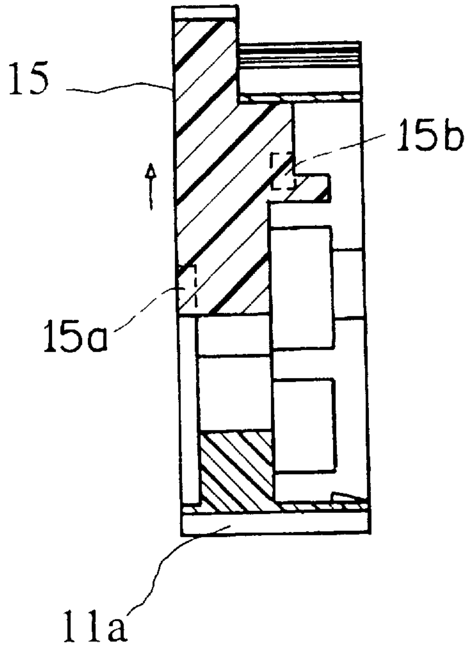
FIG. 12 is a view corresponding to FIG. 11 showing the subcomponent after completion.
Figure 13:
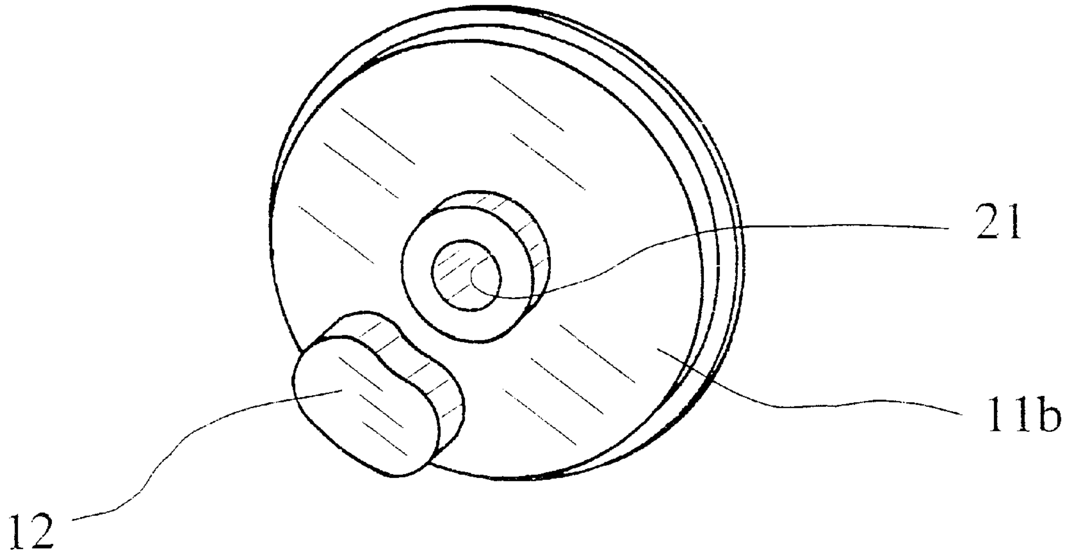
FIG. 13 shows a second subcomponent of the drive element in a perspective view from the outer side; an FIG. 14 is a perspective view of the inner side of second subcomponent of FIG. 13 which faces the first subcomponent.
Figure 14:
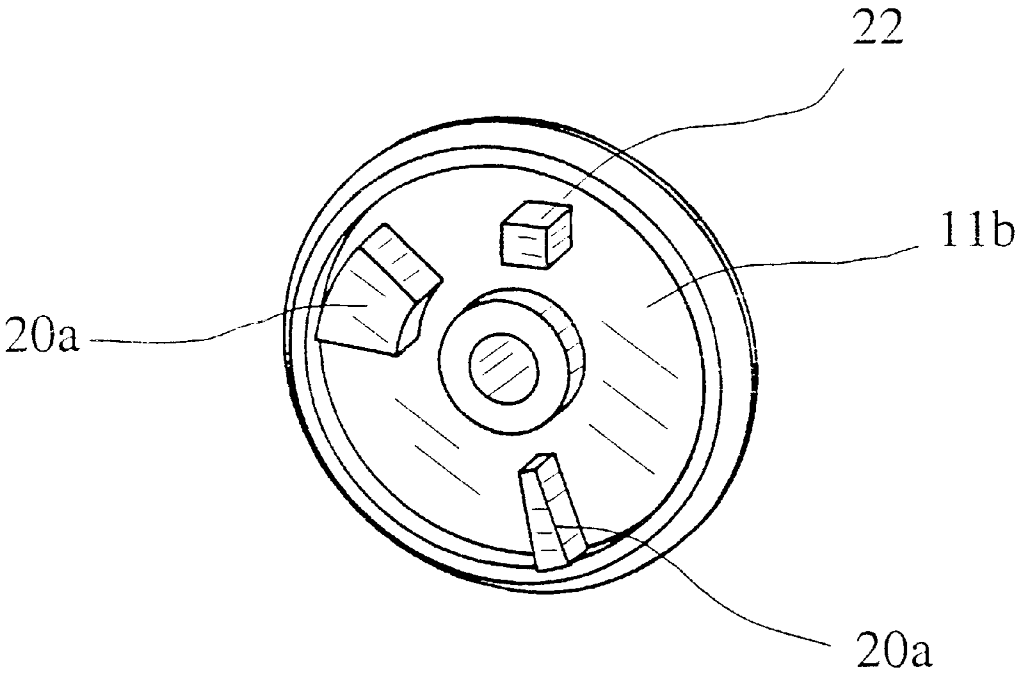

FIGS. 7 through 14 show structural details of the drive element 11 used in accordance with the present invention. FIG. 7 shows, initially and essentially, that the drive element 11 has two subcomponents **11*a*, 11*b* that are concentrically located in succession about bearing axle 21, the first subcomponent 11*a* (FIGS. 8 & 9) forming the actual drive element 11 and being permanently coupled to the drive motor 10, while the other subcomponent 11*b* bears carrier 12. The embodiment shown illustrates another concept in which the subcomponents 11***a*, 11*b* of the drive element 11 are connected to one another by a catches, and that, as shown in FIGS. 13, 14, the stops 20*a* forming clear section 20 are located on the side of the second subcomponent 11*b* opposite that having the carrier 12 and which interact with a lug 20*b* on the first subcomponent 11*a* (FIG. 8) that lies between them as is shown in FIGS. 3 & 4. However, it is also possible for the first subcomponent 11*a* to be closed, in which case the clear section 20 would be located therein and the carrier 12 would project from the inside through the clear section 20, so that the carrier 12 would provide the function served by lug 20*b*.

FIGS. 2 through 7 also show the interaction of the legs of the spring 17, which is made as a leg spring for acting, on the one hand with the blocking element 15, and on the other hand, with the second subcomponent 11*b* which bears the carrier 12. The corresponding contact block 22 on the second subcomponent 11*b* which bears the carrier 12 is especially apparent in both FIGS. 7 and 14.

Figure 8:
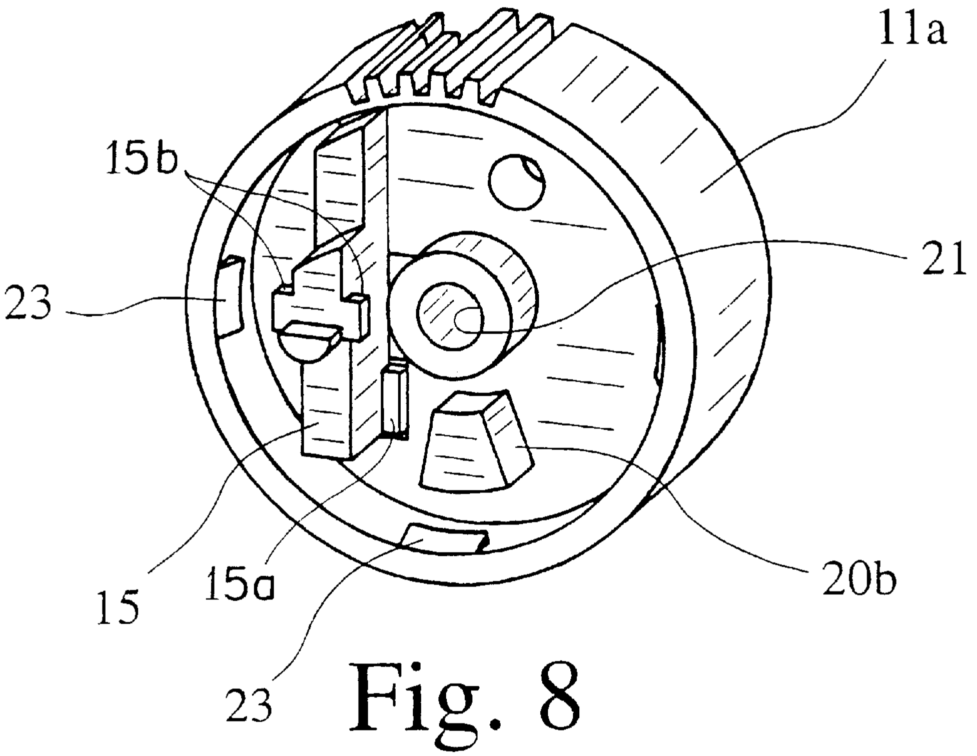
FIG. 8 is a perspective view of the top of a first subcomponent of the drive element of the invention before completion of installation.

The drive element 11, with the exception of the spring 17, is preferably made of plastic; in this embodiment, therefore, the two subcomponents 11*a*, 11*b* are made of plastic. This is a great advantage for production engineering, weight and price, and the plastic material of the two subcomponents 11*a*, 11*b* need not necessarily be identical. The inherent elasticity of the plastic easily allows the aforementioned catching of the two subcomponents 11*a*, 11*b*. FIG. 8 shows catch projections 23 on the first subcomponent 11*a* and the second subcomponent 11*b* is equipped with a peripheral edge which engages behind the catch projections 23 in the installed state.

Production of the drive element 11 and especially its subcomponent 11*a* from plastic offers a possibility which is expedient in production engineering and in producing the arrangement shown in FIGS. 8 through 12. Clever arrangement and configuration of the drive element 11 results in the fact that the blocking element 15, together with the first subcomponent 11*a* of the drive element 11 can be jointed injected. To do this, it can be fundamentally provided that the blocking element 15, before final assembly of drive element 11, is injected so as to be integrally connected with the subcomponent 11*a* by frangible plastic score lines and thus is located on the drive element 11*a*. In the final assembly, by breaking of the score lines along which the subcomponent 11*a* is connected to blocking element 15, the blocking element can then be moved into its operating position in which it can be moved relative to the drive element 11.

In this embodiment, the above explained result is achieved by the drive element 11, having a first subcomponent 11*a* with a guide channel 24 for the blocking element 15 in which the final-assembled blocking element 15 can be moved radially, by the blocking element 15, as injected being integrally connected with the drive element 11, being located laterally of the subcomponent 11*a*, axially relative to the guide channel 24, and by, in the final assembly, the blocking element 15 being moved out of the position axially into the guide channel 24 by breaking of the scored lines connecting it to the drive element 11.

Figure 9:
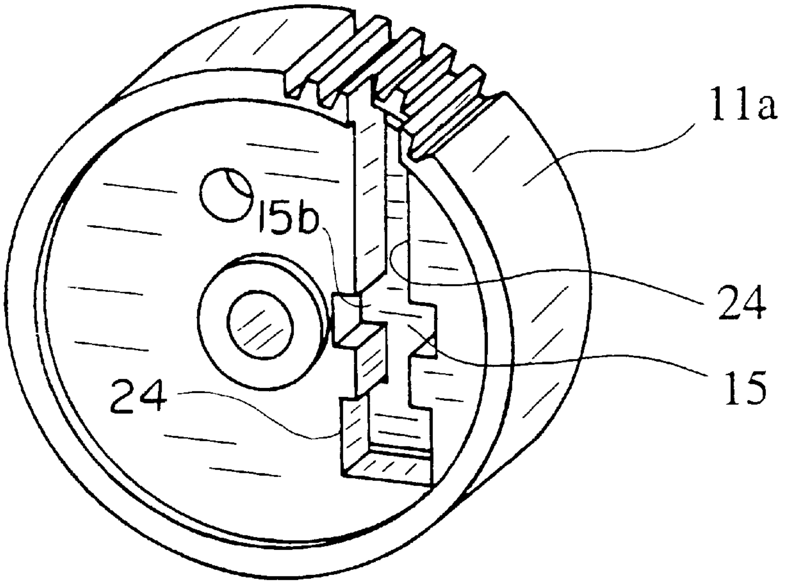
FIG. 9 is a perspective view of the bottom of the subcomponent of FIG. 8.
Figure 10:
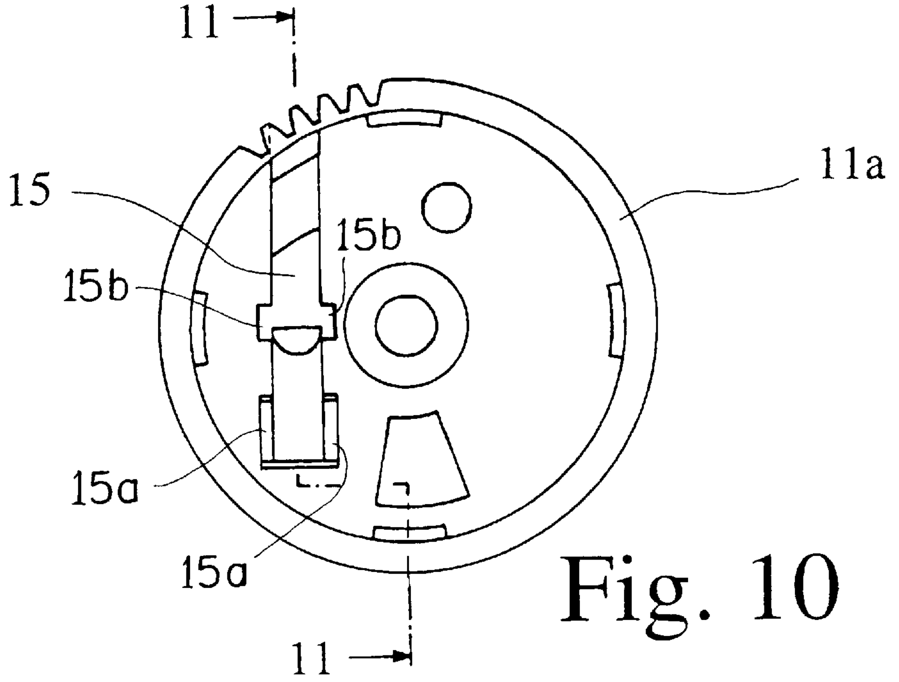
FIG. 10 is a plan view of the subcomponent of the drive element shown in FIG. 8.

FIGS. 8 through 10 of the drawings show the first subcomponent 11*a* of the drive element 11 with the blocking element 15 injected in one piece, therefore prior to final assembly. FIG. 9 shows the guide channel 24 with the still injected blocking element 15 in its background. FIG. 11 shows the location of the blocking element 15 at this time. FIG. 12 shows the location of the blocking element 15 after final assembly. It is apparent that the blocking element 15 has been pushed to the left as compared to FIG. 11 (arrow) and is now in the guide channel 24. Once in the guide channel 24, a radial pushing-out motion (shown by the arrow in FIG. 12) serves the function of bringing it into the blocking position in accordance with the invention, .i.e., extending radially beyond subcomponent 11*a* into the positions shown in FIGS. 3–6, for example.

This embodiment illustrates that the blocking element 15 is provided with clear sections or projections which correspond to projections or clear sections on the drive element 11 in the guide channel 24 such that in the operating position of the blocking element 15 they cause the desired guidance. With reference to FIGS. 8 & 9, it can be seen that, initially, guide tabs 15*a* provide guidance as the blocking member is displaced axially through subcomponent 11 a from the side shown in FIG. 8 to that shown in FIG. 9 until stop tabs 15*b* engage the central disc portion of subcomponent 11*a*, at which point the guide tabs 15*a* are free of the guide channel 24, permitting radial displacement of the blocking element 15 with tabs 15*a*, 15*b* moving over opposite sides of the disc portion of subcomponent 11*a*.

One embodiment which could be important as an alternative approach is shown by the broken lines in FIG. 1. In it, reset motion is prevented by the functional element 6 being externally fixed in the shutoff position with respect to the backward motion and being provided with the blocking element 15. When the shutoff position is reached, the blocking element 15 couples the carrier 12 to the functional element 6, and thus, prevents backward motion of the carrier 12 relative to the functional element 6. In this case, the blocking element 15 can also be assigned to the carrier 12, which is then connected to the functional element 6, to a certain extent "capturing" the functional element 6 to prevent rebound. FIG. 1 shows blocking element 15 as a simple a catch hook (which is shown by the broken line) on the functional element 6, which in the drawing is represented by the detent pawl.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Small motorized drive means for a movable functional element in a motor vehicle, comprising, a drive element in driven connection with an electric drive motor and a carrier which transfers force from the drive element to the functional element, running of the electric drive motor being, stopped in at least one shutoff position by blocking of continued movement of the drive element in a driven direction of motion by the carrier striking a stop surface on the functional element; wherein a blocking element is provided for blocking motion of the drive element backward relative to the driven direction of motion when blocking of the continued movement of the drive element in the driven direction of motion is produced by the stop surface of said functional element.

2. Drive means as claimed in claim 1, wherein said at least one shutoff position comprises two shutoff positions and wherein said blocking of the backward motion is produced by the blocking element in both of said shutoff positions.

3. Drive means as claimed in claim 2, wherein said blocking element is displaceable out of a position blocking the backward motion of the drive element without further motion of the drive element.

4. Drive means as claimed in claim 1, wherein the drive element is supported on a support and said blocking element is mounted on the drive element in movable manner; wherein at least one engagement opening which corresponds to the blocking element is located on a support; and wherein the blocking element fits into a respective engagement opening and prevents backward motion of the drive element when said at least one shutoff position of the drive element is reached.

5. Drive means as claimed in claim 4, wherein the blocking element is prestressed by a spring in a direction for engagement with the at least one engagement opening.

6. Drive means as claimed in claim 5, wherein the engagement opening has a blocking edge which adjoins an inclined reset cam for the blocking element.

7. Drive means as claimed in claim 1, wherein the drive element is supported on a carrier and is provided with at least one engagement opening for receiving the blocking element; wherein the blocking element is movably supported on the support; and wherein the blocking element fits into a respective engagement opening and prevents the backward motion of the drive element when said at least one shutoff position of the drive element is reached.

8. Drive means as claimed in claim 1, wherein the drive element is a rotatable element and can be driven in only one direction of rotation.

9. Drive means as claimed in claim 8, wherein the carrier is movable relative to the drive element over a limited angular range defined by a clear section of the drive element; and wherein the carrier is prestressed by a spring into an end position of the clear section which leads in the direction of driven rotation of the drive element.

10. Drive means as claimed in claim 9, wherein the drive element comprises two subcomponents which are concentrically located in succession about a bearing axle; and wherein a first of the subcomponents is coupled to the drive motor and a second of the subcomponents bears the carrier.

11. Drive means as claimed in claim 10, wherein the carrier is located on a first side of the second component and the clear section is located on an opposite second side of the second subcomponent and is formed by stops which interact with a lug lying in between.

12. Drive means as claimed in claim 10, wherein the subcomponents of the drive element are connected to one another by a catch arrangement.

13. Drive means according to claim 8, wherein said rotatable element is a worm wheel.

14. Drive means as claimed in claim 9, wherein the spring is a leg spring, one leg of which acts on the blocking element and a second leg of which prestresses the carrier.

15. Drive means as claimed in claims 1, wherein the drive element is made of plastic.

16. Drive means as claimed in claim 15, wherein the blocking element formed of a part of the drive element which has been separated therefrom along scored lines as it has been moved into its operating position.

17. Drive means as claimed in claim 16, wherein the drive element has a guide channel for the blocking element in which the blocking element has been moved into its operating position and along which the blocking element is radially displaceable into and out of positions blocking said backward movement.

18. Drive means as claimed in claim 17, wherein the blocking element is provided with sections which correspond to sections on the drive element for guiding movement of the blocking element.

19. Drive means as claimed in claim 1, wherein the functional element in said at least one shutoff position is externally fixed with respect to said backward motion; wherein the functional element is provided with said blocking element; and wherein the blocking element couples the carrier to the functional element and prevents backward motion of the carrier away from the functional element when said at least one shutoff position is reached.

20. Drive means according to claim 19, wherein the drive element is attached to the carrier and the functional element is not attached to the carrier.

21. Drive means as claimed in claim 1, wherein said blocking of the backward motion by said blocking element is cancellable without further motion of the drive element.

22. Drive means according to claim 1, wherein said drive means is a drive of a motor vehicle closure mechanism and said functional element is a detent pawl of the closure mechanism.

23. Drive means according to claim 1, wherein the drive element is attached to the carrier and the functional element is not attached to the carrier.

* * * * *